March 30, 1943.  H. S. SVENSON  2,315,027
HYDROCAR OR VEHICLE WITH WATER WING WHEELS
Filed Aug. 18, 1941  2 Sheets-Sheet 1
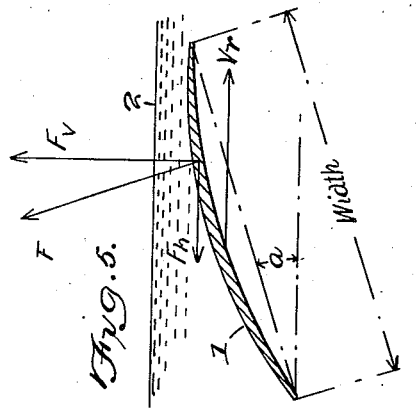
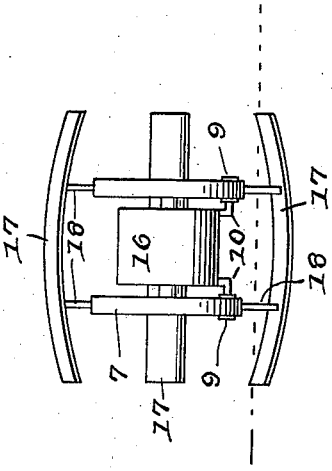
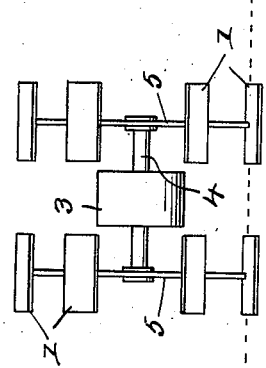
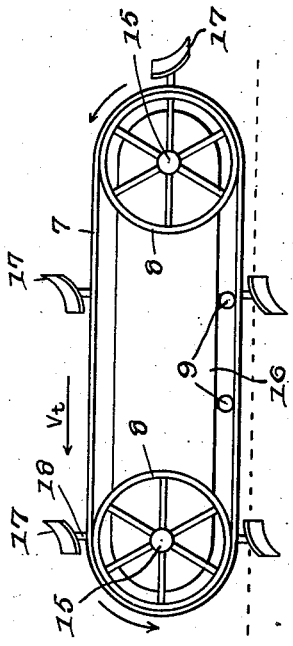
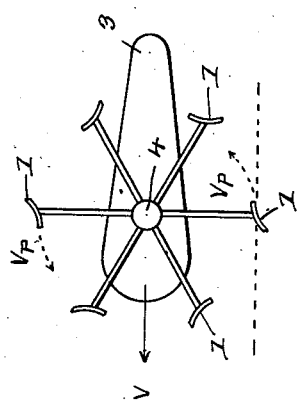
Helge S. Svenson
INVENTOR.
BY Victor J. Evans & Co.

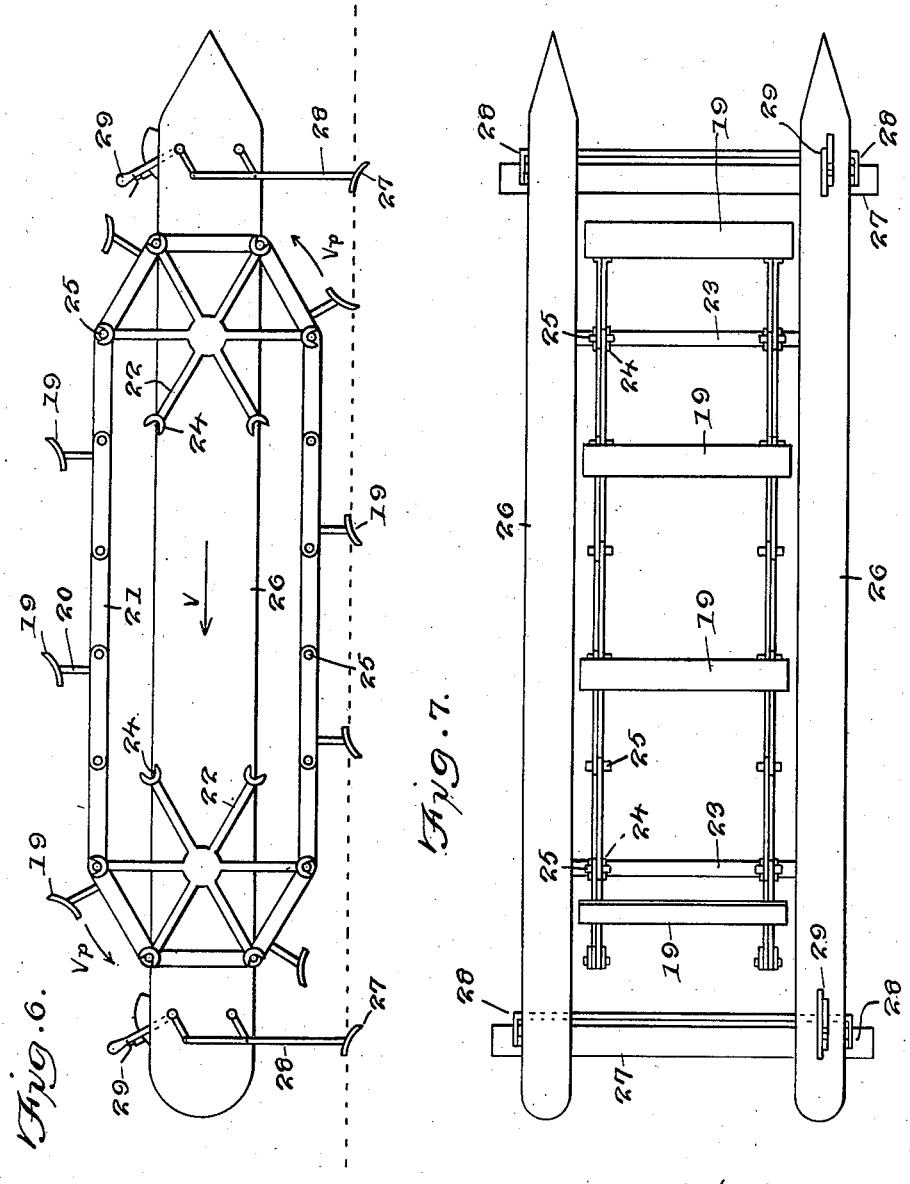

Patented Mar. 30, 1943

2,315,027

UNITED STATES PATENT OFFICE 2,315,027

HYDROCAR OR VEHICLE WITH WATER WING WHEELS

Helge S. Svenson, Villavicencio, Colombia

Application August 18, 1941, Serial No. 407,365
In Sweden October 12, 1938

2 Claims. (Cl. 115—19)

This invention relates to a hydrocar or vehicle with water wing wheels, and has for an object to provide a vehicle of this character having streamlined water wings with low angle of incidence disposed to the free hydrodynamic action of water on all sides to promote rapid transportation at low power cost consumption upon lakes and streams.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a side elevation of a vehicle with water wing wheels constructed in accordance with the invention.

Figure 2 is a front elevation of the vehicle shown in Figure 1.

Figure 3 is a side elevation of a modified form of vehicle having band type wing wheels.

Figure 4 is a front elevation of the vehicle shown in Figure 3.

Figure 5 is a diagrammatic sectional view of a water wing constructed in accordance with the invention with legends explanatory of the principle of operation.

Figure 6 is a side elevation of a modified form of the vehicle the same having chain type wing wheels.

Figure 7 is a top plan view of the vehicle shown in Figure 6, but having the propelling means in the center of the vehicle instead of on the outside.

Water wings

A water wing 1, see Figure 5 of the same kind as an airplane wing moves below the water surface 2 with the velocity $V_r$ in the direction indicated by the arrow designating the legend. The hydrodynamic pressure, positive and negative, acting upon the surface of the wing give a resultant force F with its vertical and horizontal components $F_v$ and $F_h$. $F_v$ is called the supporting component and $F_h$ the resistance component. If the angle of incidence $a$ is positive as shown in Figure 5, $F_v$ is directed upward. $F_v$ is not power absorbing and the power consumed by the wing at its linear movement is represented only by the product of $F_h$ and $V_r$.

If the wing 1 has to carry a load at the lowest possible power consumption $F_v$ must be large and $F_h$ small, and the relation between them may be called the efficiency E of the water wing.

The most important conditions for good wing efficiency are:

1. The wing must have a very thin section (profile) and the front edge must not be rounded. At greater depth, where the movement of the wing will not produce surface waves, the front edge may be slightly rounded.
2. The angle of incidence $a$ must be positive and very small, less than five degrees.
3. The wing section must be curved with the under surface flat or concave and the supper surface convex. The mean radius must be from two to ten times the width of the wing, as measured between the front and rear edges.
4. The relation between span and width must be large.
5. The supports holding and moving the wings from above the water surface must be very thin and with streamlined sections, as their resistance will add to the $F_h$ component and decrease efficiency.

Water wing efficiencies as high as 25, supports included, have been observed during experiments. A conveniently designed water wing with a surface of one square foot moving at a speed of 15 feet a second relative to the water will carry 100 pounds at a resistance force of about five pounds. This corresponds to about a thousand times the carrying capacity of the same wing in the air, if the front edge is rounded but other conditions unchanged.

Water wing wheels

Referring now to Figure 1, 3 designates a vehicle body or hull, the same being provided with a horizontal rotating shaft 4 having a set of spokes 5 on each side of the hull. At the ends of the spokes are fixed water wings 1, of the type heretofore described. The wings move through the water when passing under the shaft 4.

When the wings are not moving the body 3 will float on the water by buoyancy, displacing an amount of water corresponding to the total weight of the apparatus. When the wings start rotation in the direction shown by the arrows, they will produce a vertical force component when they pass through the lower part of the circle of rotation and hence the body 3 will float higher, displacing a smaller amount of water, as part of the weight is balanced by the vertical wing force component. At a certain speed of rotation the vertical component of the wing forces may balance the total weight of the apparatus and the body will be lifted up over the water and remain supported only by the wing forces. The horizontal wing force component will act upon the body for a time producing a horizontal acceleration, moving the apparatus in the direction indicated until it reaches a velocity V, when the total air resistance is balanced by said horizontal wing force component. It is supposed here that the body has necessary stabilization and steering elements, but that they are not producing positive water resistance. The wings will dip into the water when they pass under the center of rotation, and if their linear velocity relative to the body is $V_p$ their velocity $V_r$ relative to the water will be $V_p$ less V. The wing wheel will be immersed into the water a few inches and slip through the water with the relative velocity $V_r = V_p - V$ just as the wheels of a land car will sink down and slip when running over loose sand.

Band type wing wheels

Experiments show that a device constructed as illustrated in Figures 1 and 2 does not promote highest efficiency obtainable because of the fact that the angle of incidence varies widely through the immersed part of the rotation circle, the time period of this immersed part, or active part being very short. To obtain a more constant angle of incidence, and a longer active immersed path a band type wheel is preferable, this modified form of the invention being shown in Figures 3 and 4. In this form of the invention an endless metal band 7 connects two respective pulleys 8 disposed on horizontal rotating shafts 15 carried by the body or hull 16. Along each band are fixed water wings 17, similar to the water wings 1 previously described. The water wings are secured to the bands by low resistance streamlined supports 18. When the pulleys 8 rotate around the shafts 15 in the direction indicated by the arrows, the water wings will get an almost straight line movement through the immersed part of their path with constant angle of incidence. Like water wing wheels shown in Figures 1 and 2, at a certain speed the vertical force components from the immersed water wings will balance the total weight of the vehicle and the vehicle will roll over the water 2 with a velocity V, where the air resistance will be balanced by the horizontal force components from the immersed water wings. If the linear velocity of the water wings in the straight line parts is $V_t$ relative to the vehicle body 16, the velocity relative to the water of the immersed water wings will be $V_r = V_t - V$, as in the case of the aforesaid water wing wheels. The vertical force components will be transmitted to the body 16 through the bands 17 and their pulleys 8 and through extra supporting rollers 9 for the bands carried by brackets 10 secured to the body 16, see Figure 4.

Chain type wing wheels

A further modified form of the invention is shown in Figures 6 and 7 in which the water wings 19, similar to the water wing which heretofore described, are fixed by supports 20 to the links of endless chains 21. The chains travel on and connect spoke wheels 22 which are rotated around respective shafts 23 and have notches 24 to receive link connecting pins 25 of the chains. The water wings may be fixed to all the links or to any number of them. As heretofore described the water wings are moved at a mean velocity $V_r$ in the straight part of the path of the chain, relatively to the water 2, and the vertical force components from the immersed wings will balance the total weight and the vehicle will move rolling on the water in the direction indicated by the arrow head until it reaches a velocity of V, where its air resistance is balanced by the horizontal components of the wing forces.

The vehicle body 26 is formed of two pontoons, one on each side of the moving wing system, see Figure 7.

Fixed water wings

In order to improve general stability and obtain more supporting capacity when starting or stopping, or when driving slowly, the vehicle must be equipped with one or more fixed water wings 27, see Figures 6 and 7. The wings are adapted to be swung below the water surface or lifted up, as necessary, by means of low resistance streamlined supports 28 operated through the medium of manual controls 29.

Stabilization of water wing wheels

A water wing with a straight axis in the span direction has poor sidewise stability. To obtain proper stability the axis of the wings must be curved or broken as shown in Figure 4, and the form of the curve must be such as to insure that the hydrodynamic metacenter will be above the center of gravity for all angles of heel. As shown in Figure 4 the axis of the water wings has a circular curve but stability may be required also by a V-shaped or U-shaped wing axis.

From the above description it is thought that the construction and operation of the invention will be fully understood without further explanation.

What is claimed is:

1. In a vehicle, for travelling or rolling on water including a body and normally in support by buoyant forces, propulsion and supporting means comprising thin streamlined immersed water wings moved relatively to the water with a small angle of incidence, said wings being freely exposed on all sides to the reactive forces from the water in immersed position and having a relation between span and width larger than one, motion transmission means connected to the water wings, and other water wings disconnected from the transmission means, and movable supports connecting said other water wings to said body, said supports permitting said other water wings to be immersed below the water surface or lifted above the water surface, said wings when immersed increasing the stability and carrying capacity of said body when starting, stopping, or running at low speed.

2. In a vehicle for traveling or rolling on water including a body and normally supported by buoyant forces, propulsion and supporting means comprising stream-lined immersed water wings moved relatively to the water with a small angle of incidence, and water wings disconnected from the transmission system with movable supports connecting the wings to the body, said supports permitting the water wings to be immersed below the water surface or above the same, said wings when immersed increasing the stability and carrying capacity of the body when starting, stopping or running at low speed.

HELGE S. SVENSON.